United States Patent [19]

Schindler et al.

[11] Patent Number: 4,482,514
[45] Date of Patent: Nov. 13, 1984

[54] PROCESS FOR THE PRODUCTION OF AN ULTRAFILTRATION MEMBRANE FROM POLYAMIDE

[75] Inventors: Erich Schindler, Aschaffenburg; Franz Maier, Obernburg, both of Fed. Rep. of Germany

[73] Assignee: Akzo N.V., Arnhem, Netherlands

[21] Appl. No.: 285,136

[22] Filed: Jul. 20, 1981

[30] Foreign Application Priority Data

Jul. 25, 1980 [DE] Fed. Rep. of Germany ....... 3028213

[51] Int. Cl.³ .............................................. B29D 27/04
[52] U.S. Cl. ................................ 264/41; 264/210.5; 264/288.8; 264/289.3
[58] Field of Search ..................... 264/41, 184, 210.1, 264/210.5, 288.8, 289.3; 425/66; 427/172, 244

[56] References Cited

U.S. PATENT DOCUMENTS

| | | | |
|---|---|---|---|
| 3,615,024 | 10/1971 | Michaels | 210/500.2 X |
| 3,876,738 | 4/1975 | Marinaccio et al. | 264/41 |
| 4,203,847 | 5/1980 | Grandine | 264/41 X |
| 4,340,481 | 7/1982 | Mishiro et al. | 210/500.2 |

*Primary Examiner*—Evan K. Lawrence
*Attorney, Agent, or Firm*—Michael J. Striker

[57] ABSTRACT

A process is disclosed for the production of a membrane suitable for ultrafiltration and cast from a solution in formic acid of a polyamide or a mixture of polyamides, characterized by bringing the solution produced with the addition of about 1 to 7% polyethylene glycol to a temperature below about 18° C., applying the solution as thin layer onto a carrier film resistant to the constituents of the solution, conducting this solution through a precipitating and washing bath moving in the reverse direction, with said layer, subsequent to emerging from the bath, being stripped from the carrier film as a coagulated and washed membrane and dried thereafter. Preferred embodiments include stretching the membrane, prior to drying, to a ratio from 1.5:1 to 2.5:1; subjecting it to heat setting in conjunction with the drying; using a minimum formic acid concentration of 80% for the solution or mixture; using 12 to 22% polyamide in the solution or mixture; and employing an air stretch of 2 seconds, before the precipitating and washing bath.

14 Claims, 6 Drawing Figures

PROCESS FOR THE PRODUCTION OF AN ULTRAFILTRATION MEMBRANE FROM POLYAMIDE

The invention relates to a process for producing, from polyamide, a membrane suitable for ultrafiltration, and to an ultrafiltration membrane produced therefrom.

Ultrafiltration membranes in the form of hollow filaments are, for instance, known from DE published application No. 26 06 244. In the process described therein, the spinning solution will, for instance, consist of a 15 to 20% polyamide solution, wherein the solvent may be formic acid. A substance, for instance a suitable metal salt, is added to this solution. After casting, the solution is fed into a coagulating bath. Upon conclusion of coagulation, the metal salts are washed out in a washing bath, whereby the desired pores are formed, and the membrane produced in this manner will contain a lattice work of fine filter channels uniformly distributed over its entire cross-sectional area.

It was then found, that it is possible to produce polyamide membranes also without requiring substances for the formation of pores, and that ultrafiltration properties are present, albeit to a very limited extent, already in films produced from a solution of a polyamide in formic acid. The viscosity of castable solutions must be relatively high and this is the reason that only solutions with a high polyamide concentration are suitable for the production of cast membranes. Said solutions will, however, result in very small pores or widely spaced distribution and to very low ultrafiltration rates which are not suitable for any known purpose. In order to obtain useful pore sizes and porosities to ensure adequate ultrafiltration rates, it would thus be necessary to reduce the polyamide concentration of the solution to such an extent that casting of the solution would no longer be possible.

It is therefore the object of the invention, to make available solutions in formic acid of a polyamide or of a mixture of polyamides, which may be fabricated into cast membranes and wherein said solutions may be adjusted in their concentration in such way that membranes cast therefrom will be of the desired pore sizes and ultrafiltration rates.

According to the invention, this object is attained by bringing the solution, produced with the addition of about 1 to 7% polyethylene glycol, to a temperature below about 18° C., applying the solution as thin layer onto a carrier film resistant to the constituents of the solution, conducting this solution through a precipitating and washing bath moving in the reverse direction, with said layer, subsequent to emerging from the bath, being stripped from the carrier film as a coagulated and washed membrane, and dried thereafter.

The respective quantity ratios are, in all instances, quoted as weight percentages.

In a preferred modification of the process according to the invention, the membrane is, prior to drying, stretched in at least one direction to a ratio of about 1.5:1 to 2.5:1. Stretching will increase the strength of the membrane and allow adjusting of the pore size. It has proven suitable herein, to subject the membrane to stretching over a drawing rod. Particularly good results are achieved when the drawing rod has been uniformly heated to a temperature of about 130° to 140° C.

According to the invention, the ultrafiltration membranes are subjected to heat setting at the beginning of the drying procedure. It is suitable therein, with inhibition of longitudinal and/or lateral contraction, that the membrane is initially warmed for heat setting to about 130° C., predrying being simultaneously effected thereby, and then to finish-dry it at about 60° to 80° C. Prevention of longitudinal and lateral contraction may be achieved by placing the film onto a conveyor band, heated rollers etc.

In a preferred embodiment of the invention, formic acid with a minimum concentration of about 80% is used for producing the solution. Suitable ultrafiltration rates will be obtained therein, when using as a solution one with about 12 to 22% polyamide in formic acid with a minimum concentration of 75%.

Membranes with particularly suitable pore sizes and ultrafiltration rates will be obtained when using solutions containing about 14 to 20% polyamide in formic acid with a minimum concentration of 75%.

Suitable for the process of the invention are, in principle, all polyamides, copolyamides and their mixtures, which are soluble in formic acid and which, with the addition of polyethylene glycol, will result in a castable solution. Proven to be particularly suitable were, for instance, the polyamides nylon 6, nylon 6,6 or copolymers of a polyamide, produced for instance, from AH salt (abbreviation for the salt of adipic acid with 1,6-hexanediamine) or ε-caprolactam. Addition of about 2 to 5% polyethylene glycol to the solution has proven suitable herein. It has also proven suitable to hold the temperature of the solution, or, respectively, the temperature of the coagulating and washing bath, to below 15° C. To enhance skin formation, it will be advantageous to allow for a remaining time in ambient air of a minimum of 2 seconds.

The membrane produced by the process as described afore, being suitable for ultrafiltration, is distinguished by consisting of an ultrafiltration and a backing layer, with the pore size of the backing layer increasing with the distance from the ultrafiltration skin.

The ultrafiltration membranes as per invention will usually be of a thickness from 10 to 300 μm. Preference is given to ultrafiltration membranes with a thickness from 20 to 150 μm.

Membranes with an ultrafiltration rate of 20 to 20,000 l/m² hbar, have proven to be particularly suitable for ultrafiltration in the most differing fields.

The filtrating characteristics were determined with dextran of various average molecular weights in aqueous solutions (5%). Equipment: Amicon TCF 10, 1 bar pressure at 25° C.

A membrane with an ultrafiltration rate of 50 l/m² hbar will still retain 95% of dextran with a molecular weight of 20,000, a membrane with an ultrafiltration rate of 347 l/m² hbar will retain 85% of dextran with a molecular weight of 64,000, and a membrane with an ultrafiltration rate of 13,800 l/m² hbar will retain 2% of dextran with a molecular weight of 2,000,000.

In membranes of high ultrafiltration rate, the pore size may be determined by the bubble-point method, wherein air of 22° C. is blown through an alcohol-wet filter (ASTM method F 316-70 (1976)). For a membrane with an ultrafiltration rate of 13,800 l/m² hbar, a pore size of 300 nm will thus be determined, and of 500 nm for an ultrafiltration rate of 19.80 l/m² hbar.

The invention shall be explained more closely by drawings and examples. Shown are, in:

FIG. 1 the schematic representation of an arrangement to produce, by the process as per invention, the membranes as enumerated in the examples, FIG. 2 the enlarged cross section of an ultrafiltration membrane from nylon 6, FIG. 3 the enlarged representation of the surface, formed by the backing layer, of the membrane in FIG. 2 with an ultrafiltration rate of 347 l/m² hbar, FIG. 4 the enlarged representation of the surface, formed by the ultrafiltration skin, of the membrane in FIG. 2 with an ultrafiltration rate of 347 l/m² hbar, FIG. 5 the enlarged representation of the surface, formed by the backing layer, of a membrane with an ultrafiltration rate of 13,800 l/m² hbar, FIG. 6 the enlarged representation of the surface, formed by the ultrafiltration skin, of a membrane with an ultrafiltration rate of 13,800 l/m² hbar.

FIG. 2 shows in a schematic the enlarged cross section of this ultrafiltration membrane with an ultrafiltration skin H and a backing layer. The pore size of the ultrafiltration membrane will increase with the distance from the ultrafiltration skin. The entire thickness of the membrane is 30 μm, as listed in Table II.

TABLE I

Figure 1:
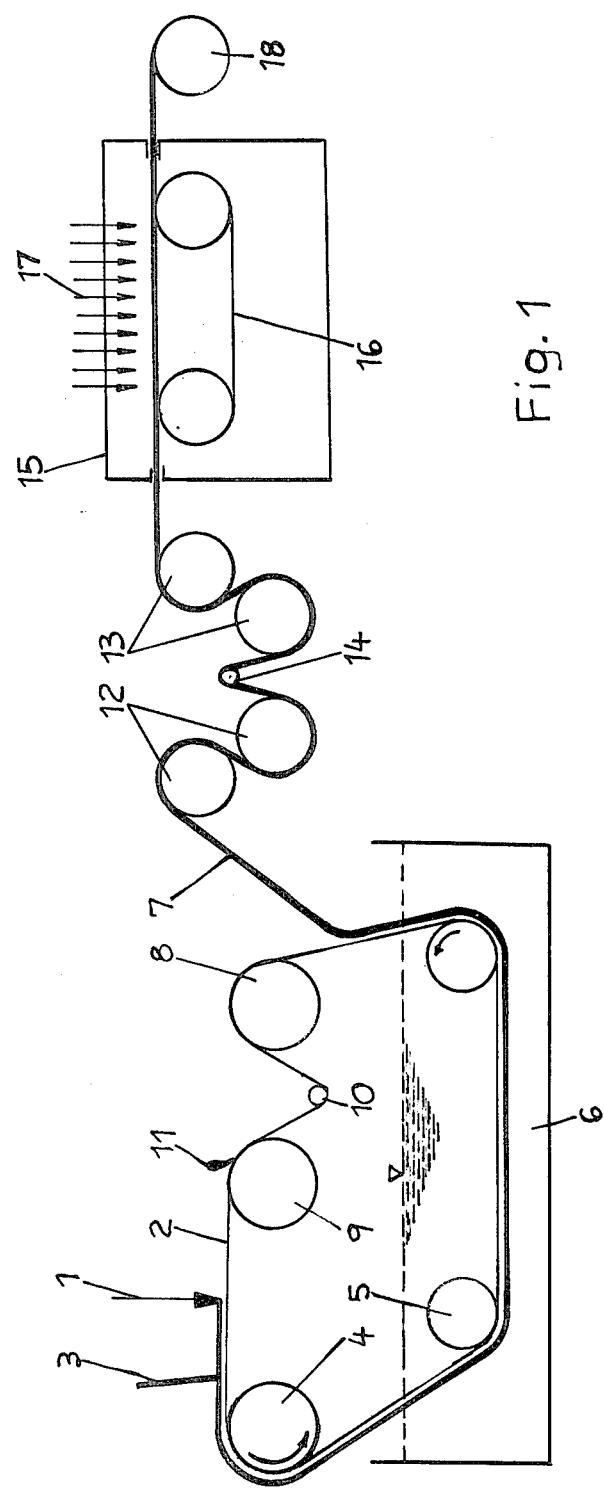

| Solution cons. No. | Polyam. 6 concentr. % | Median mol wt of PA 6 Mn | PEG cncentr. % | Median mol wt of PEG Mn | applied layer thickn. of solution μm | rem. time in air sec. | rem. time in coag. and washing bath sec. |
|---|---|---|---|---|---|---|---|
| I | 20 | 35,000 | 2 | 600 | 100 | 5 | 120 |
| II | 16 | 35,000 | 3.2 | 600 | 150 | 5 | 120 |
| III | 14 | 20,100 | 4.2 | 600 | 150 | 5 | 120 |
| IV | 14 | 20,100 | 4.2 | 2 000 | 150 | 5 | 120 |

EXAMPLES

Four different solutions 1 were prepared and applied with an applicator as known per se and not shown herein, onto a dry carrier film 2 from polyester and spread thereon by means of a squeegee 3. The data required for production by the process as per invention are shown in Table I for the four different solutions. After a remaining time of a few seconds (e.g., 2 sec.) in ambient air, the solution is immersed with the aid of carrier film 2 and rollers 4 and 5 into a coagulating and washing bath 6. Water was used as coagulating and washing fluid, the water quantity of the reverse flow being so adjusted that concentration of formic acid at the drain of the coagulating and washing bath would not exceed 10%. The temperature of the solution and of the coagulating and washing fluid was held at a temperature of 13° C.

Subsequent to drawing the meanwhile formed membrane 7 out of the coagulating and washing bath 6, membrane 7 was stripped from carrier film 2. Carrier film 2 was returned over rollers 8 and 9 and takeup pulley 10 to the applicator 1, with a scraper 11 serving to clean the film from dirt particles and to dry it.

The still wet membrane 7 was conducted to a drawing section consisting of the roller pairs 12 and 13 and the drawing rod 14. Over the drawing rod 14, uniformly heated to about 130° C., the membrane was stretched to a ratio of 2:1. The still wet membrane 7 was subsequently conducted into a dryer 15, and membrane 7 after entering dryer 15, deposited upon a conveyor band 16 in order to prevent longitudinal and lateral shrinking and then initially heated by means of air blower 17 to about 130° C., with finish-drying of the membrane proceeding at temperatures of about 70° C. After exiting from dryer 15, the membrane was reeled onto a spool 18.

The characteristic values for the membranes produced as per invention, are listed in Table II.

Figure 2:
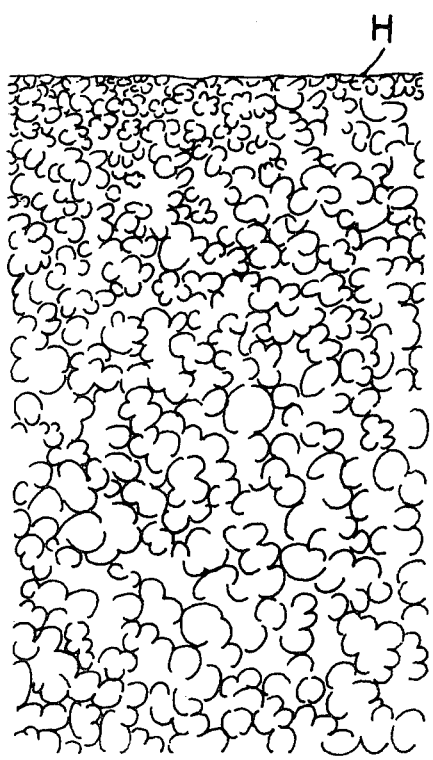
Figure 3:
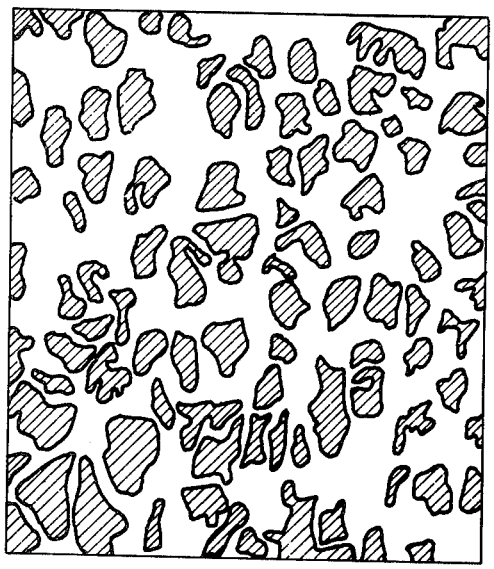
FIG. 3 shows the surface of the backing layer of this ultrafiltration membrane, located opposite to the ultrafiltration skin.
Figure 4:
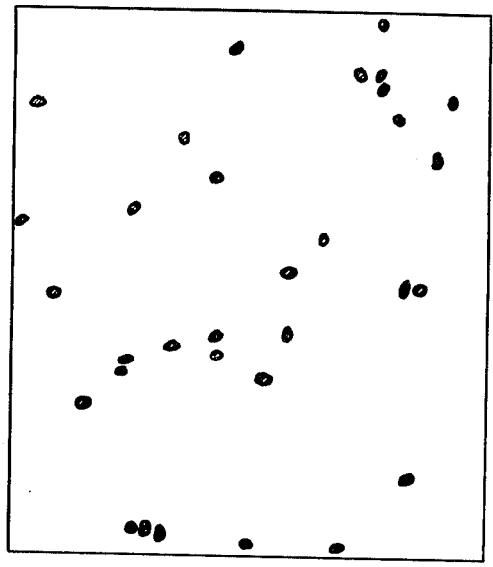
FIG. 4 shows the surface of the ultrafiltration skin of this ultrafiltration membrane with an ultrafiltration rate of 347 l/m² hbar.
Figure 5:
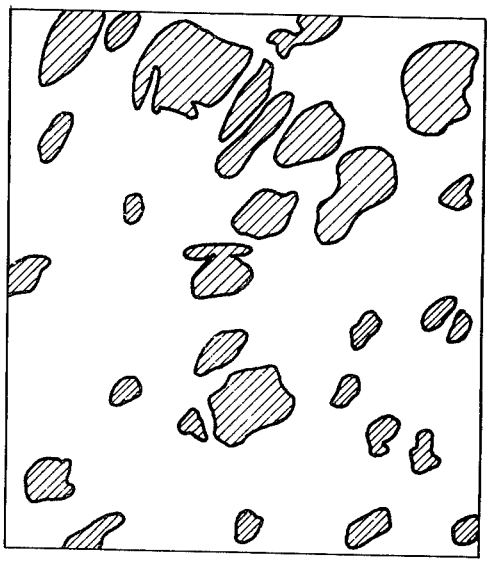
FIGS. 5 and 6 show the surfaces of an ultrafiltration membrane produced from solution IV (Table I), with FIG. 5 representing the surface of the backing layer and FIG. 6 representing the surface of the ultrafiltration skin with an ultrafiltration rate of 13,800 l/m² hbar (as per Table II).
Figure 6:
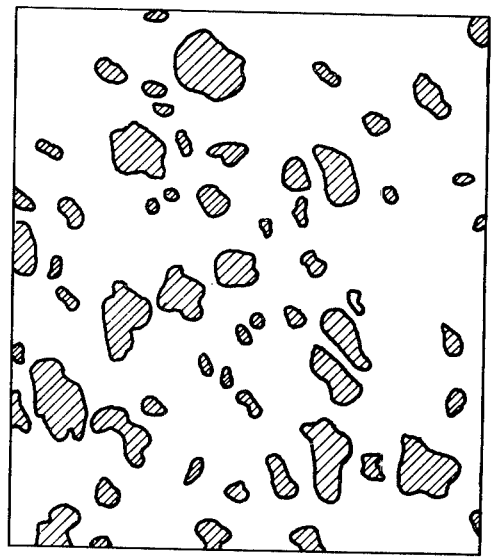

The membrane produced from solution I (as per Table I), is represented in FIGS. 2, 3 and 4.

TABLE II

| Solution cons. No. | Ultrafiltration rate l/m² hbar | Membrane thickness μm |
|---|---|---|
| I | 347 | 30 |
| II | 1,200 | 73 |
| III | 10,000 | 41 |
| IV | 13,800 | 70 |

We claim:
1. Process for the production of a cast membrane suitable for ultrafiltration, composed of an ultrafiltration skin and a porous support layer, from a solution in formic acid of a polyamide or a mixture of polyamides, comprising providing as a casting solution about 12 to 22% polyamide and about 1 to 7% polyethylene glycol in formic acid having a minimum concentration of 75%, bringing said solution to a temperature of below about 18° C., applying said solution as a thin layer onto a carrier film resistant to the components of said solution, moving said applied solution on said carrier film through a precipitating and washing bath moving countercurrent to said moving carrier film, removing said applied solution from said precipitating and washing bath, stripping said applied solution as a coagulated and washed membrane from said carrier film, stretching said coagulated and washed membrane in at least one direction from about 1.5:1 to 2.5:1 and drying said stretched coagulated and washed membrane.

2. Process according to claim 1, wherein said stretching is effected by drawing said membrane over a drawing rod.

3. Process according to claim 2, wherein said membrane is stretched by drawing over a drawing rod which has been uniformly heated to about 130° to 140° C.

4. Process according to claim 1, further comprising subjecting the membrane to heat setting in conjunction with the drying procedure.

5. Process according to claim 4 wherein the membrane is initially warmed for heat setting to about 130° C. and then is finish-dried at about 60° to 80° C. with prevention of longitudinal and/or lateral contraction.

6. Process according to claim 1, employing, for preparing the solution, formic acid with a minimum concentration of about 80%.

7. Process according to claim 1, employing in the solution, about 14 to 20% polyamide in formic acid having a minimum concentration of 75%.

8. Process according to claim 1 using nylon 6 as the polyamide.

9. Process according to claim 1 using nylon 6,6, as the polyamide.

10. Process according to claim 1, wherein the solution contains a copolymer of a polyamide from AH salt and ε-caprolactam dissolved in formic acid.

11. Process according to claim 1, wherein the solution contains about 2 to 5% polyethylene glycol.

12. Process according to claim 1, wherein the temperature of the solution is below approximately 15° C.

13. Process according to claim 1, wherein the solution applied to the carrier film is put into the washing and precipitating bath after having remained in the ambient air for a minimum of about 2 seconds.

14. Process according to claim 1, wherein the temperature of the washing bath is held to below about 15° C.

* * * * *